April 2, 1940. D. W. BRANSTETTER Re. 21,413

FACIAL SHAVING INSTRUMENT

Original Filed Dec. 13, 1934

INVENTOR

Donald W. Branstetter

Reissued Apr. 2, 1940 Re. 21,413

UNITED STATES PATENT OFFICE 21,413

FACIAL SHAVING INSTRUMENT

Donald W. Branstetter, Valley Park, Mo., assignor, by mesne assignments, to Art Metal Works, Inc., Newark, N. J., a corporation of New Jersey Original No. 2,055,517, dated September 29, 1936, Serial No. 757,307, December 13, 1934. Application for reissue December 24, 1936, Serial No. 117,677

17 Claims. (Cl. 30—43)

This invention relates generally to shaving instruments, and more particularly to a facial shaving instrument for cutting or shaving human beards and the like.

My invention has for its prime object the provision of a power-driven shaving instrument adapted for cutting or shaving the hairs of a human beard and the like.

My invention has for another object the provision of a shaving instrument, including a (rotary) cutting element which is protected from actual contact with the skin of the face, while most efficiently effecting a close cropping or cutting of the hairs of the beard for providing a safe, smooth shave to the user of the device.

My invention has for still another object the provision of a shaving instrument, characterized by having relatively two parts which are neatly and compactly arranged and most inexpensively manufactured, so as to be available for popular usage—the several parts of the device being capable of ready disassembly for cleaning purposes for maintaining the hygienic condition thereof.

And with the above and other objects in view, my invention resides in the novel form, construction, arrangement and combination of parts hereinafter described and pointed out in the claims.

In the accompanying drawing—

Figure 1:
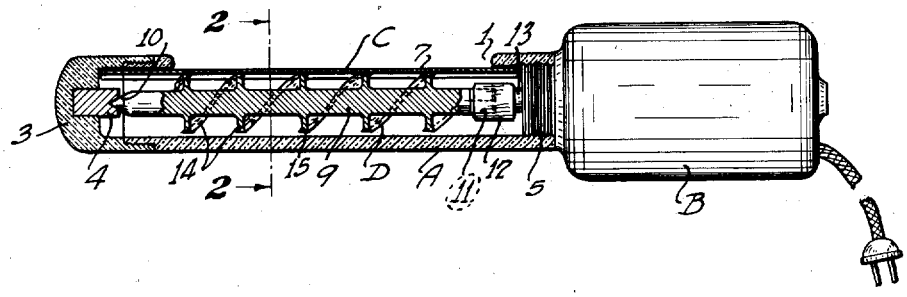
Figure 1 is a side view partly in section of a shaving instrument embodying my invention.

Referring now more in detail and by reference characters to the drawing, which illustrates preferred embodiments of my invention, my improved shaving instrument comprises an elongated housing A of tubular form, which may be constructed of metal, fiber or moulded material, as may best present an attractive appearance at small expense.

The housing A is provided with a longitudinal slot 1 extending substantially the length of the housing. The inner wall of the housing A is provided with a pair of longitudinal grooves 2, disposed adjacent to the respective marginal walls of the slot 1 for a purpose presently appearing.

At one, or as may be said, its outer end, the housing A is provided with a threadedly engaged removable cap or end closure 3, which carries an inwardly projecting pivot-bearing member 4, and at its other end, the housing A is removably threadedly engaged on the suitably provided hub or end 5 of the frame of a prime-mover or electric motor B, the frame or housing of this motor B being preferably nicely rounded and proportioned for most conveniently providing or forming a hand-grip or handle of the device.

Figure 2:
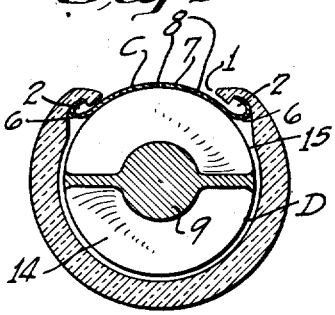
Figure 2 is an enlarged cross-sectional view taken approximately along the line 2—2, Figure 1.

C designates a face guard or elongated plate which is arcuate in cross-section and has its respective side margins curled or turned as at 6 toward the convex or outer face 7 of the guard C. The guard C is composed of a relatively thin, resilient or flexible preferably metallic material, and is adapted on removal of the cap 3 to be slid or fitted lengthwise into the housing A, with the convex face 7 of the guard C presented outwardly, and with the curled margins 6 engaged in the grooves 2, of the housing A, as best seen in Figure 2.

The guard C is perforated or provided with series of longitudinally spaced elongated apertures or slots 8 disposed obliquely or diagonally, that is to say, at an angle of preferably approximately forty-five degrees, with respect to the longitudinal axis of the housing A, the inside edges of the walls of each slot 8 being preferably truly square or otherwise sharpened for providing a shear or cutting edge for co-operation with the cutting elements of the device, as shortly appearing.

Revolvable in the housing A is a rotary knife D, which comprises a shaft portion 9 longitudinally and preferably axially disposed in the housing A, and provided at its outer end with a conical or pivot point 10 for engaging the pivot bearing 4 carried by the housing cap 3, the shaft 9 at its other or inner end having a squared or fluted shank 11 removably engageable with a socket 12 mounted on the end of the motor-shaft 13 of the motor B, as best seen in Figure 1.

The shaft 9 carries a series of helical cutting elements or knife blades 14, which preferably extend continuously for substantially the length of the knife D, and are, also preferably, formed integrally with the shaft 9, the knife D having the general shape and appearance of a worm-thread or screw-member, as best seen in Figure 1.

Figure 3:
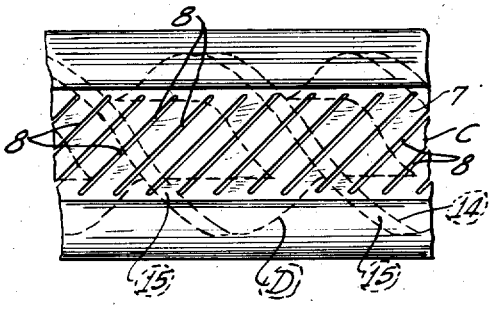
Figure 3 is an enlarged fragmentary top plan view of the instrument.

The blades 14 as disposed obliquely or diagonally, that is to say, at an angle of preferably approximately forty-five degrees, with respect to the longitudinal axis of the shaft 9, the inclination of the blades 14, however, being opposite to, that is to say, at approximately ninety degrees from the inclination of the slots 8, as best seen in Figure 3.

The respective blades 14 are each formed with a flat periphery 15 disposed in a cylindrical plane in which is also disposed the inside wall of the guard C, so that the peripheries 15 of the blades 14 are adapted for sliding engagement with the inside wall or face of the guard C, the engagement of the resilient curled margins 6 of the guard C with the slots 2 in the housing A serving most efficiently in biasing the guard C upon the flat peripheries 15 of the knife-blades 14, as best understood from Figure 2.

The peripheral marginal edges of the blades 14 are likewise formed truly square or otherwise sharpened for providing a shear or cutting edge co-operable with the sharpened edges of the walls of the slots 8 in the guard C, and I might point out that, the slots 8 being disposed angularly to the axis of the housing A, and hence also obliquely disposed with respect to the direction of rotation of the blades 14, the respective sharpened or cutting edges of the blades 14 and walls of the slots 8 are disposed in a V formation most effective for providing a scissors effect for clipping or cutting any hairs which may project through the slots 8 for engagement by the blades 14, as will be understood from Figure 3.

As has been said, the plate is biased upon the flat peripheries 15 of the blades 14, thus relieving the cutting edges of both the plate C and knife D from the biasing pressure of the plate C on the knife D, and it will be readily seen that the sliding engagement of the blades 14 on the plate C, under influence of the biasing pressure of the plate C on the blades 14, serves most efficiently for effecting a continuous and automatic honing or sharpening action, as it may be said, upon the cutting edges of the flat peripheries 15 and the walls of the slots in the plate C.

In the use and operation of the device of my invention, the motor B is motivated in the conventional manner from a suitable source of current not shown, which effects preferably a very rapid rotary actuation of the knife D within the housing A.

The operator, holding the instrument in any desired manner, but preferably by grasping the frame of the motor B, presses the guard C firmly against and moves the instrument over the face to be shaven.

As the instrument is moved over the face, the skin bulges slightly into the slots 8 of the guard, and the hairs to be cut are admitted or project into and through the slots 8, whereby the several hairs become caught or engaged in V-like manner between the rapidly moving blades 14 and the walls of the slots 8 and are thereby quickly cut or severed from the skin being shaved.

Figure 4:
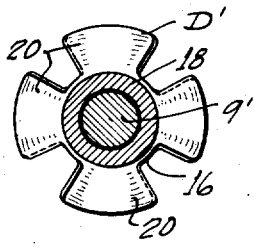
Figure 4 is a cross-sectional view of a modified form of rotary knife for alternative use with the instrument of Figure 1.
Figure 5:
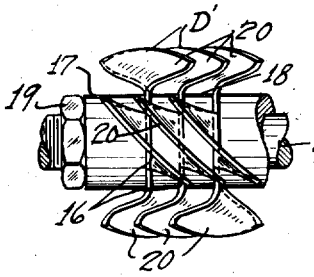
Figure 5 is a fragmentary side view of the knife of Figure 4.

Figures 4 and 5 illustrate a modified form of rotary knife D, which is composed of a series of knife members or discs 16, mounted on the shaft 9 between suitable spacer elements 17, 18, the outer end of the shaft 9 being threadedly engaged by a suitable securing member or nut 19 for clamping the discs 16 thereon.

Each disc 16 is provided with a series of, preferably four, radially projecting cutting elements 20 having the general shape of wings or vanes, each element 20 having a flat arcuate periphery which is sharpened and shaped similarly to that of a blade 14, and being twisted or obliquely disposed with respect to the direction of rotation of the shaft 9, so as to occupy the same relative position, with respect to and for functioning in the same co-operative manner with the cutting edges of the walls of the slots 8 of the guard C, as do the blades 14 of the knife D.

It will be seen that my invention provides a power-driven shaving instrument highly adapted for cutting the hairs of a beard for shaving the face of the user thereof, and I might more particularly point out that the cutting elements of the instrument are fully covered and safely protected from actual contact with the skin, by means of the guard C, yet the device permits the close cropping or cutting of the beard for effecting a clean, smooth shave of the face.

And I might further reiterate that the cutting knife of the instrument is fully enclosed in a housing, which most conveniently forms an extension of the frame of the motivating means, which frame is shaped to fit the hand, so that it forms also the handle of the device.

Furthermore, the device, which comprises merely three essential shaving elements, namely: a tubular housing, a removable rotary knife, and a removable perforated guard, which protects the face from the knife, has an end of the housing readily also removable so that the knife and the guard may be quickly and with facility be disassembled from the housing for cleaning and like purposes of hygiene.

I might add that, preferably, the prime mover B is a simple induction motor for use with alternating current supply, although, of course, a direct current motor may be employed. However, since a direct current motor for such purposes will usually be too bulky to be easily grasped by the hand, the housing A and its contained elements C, D, may most conveniently in such case be mounted on the end of a flexible shaft which is driven by the D. C. motor in the usual manner, the motor being supported from the wall or ceiling or a stand, as may best serve the purpose.

It will be understood that changes and modifications, in addition to those shown and suggested, in the form, construction, arrangement and combination of the several parts of my improved shaving instrument may be made and substituted for those herein shown and described without departing from the nature and principles of my invention.

Having thus described my invention, what I claim and desire to secure by Letters Patent is:

1. In a shaving instrument, the combination comprising a holder, a rotary knife within the holder, and a slotted plate for protecting the face from the knife, the plate having curled margins engaging the holder for biasing the plate on the knife for providing a scissors effect between the plate and the knife.

2. In a shaving instrument, the combination comprising a holder, a rotary knife within the holder and having series of helical blades provided with flat peripheries and a plate for protecting the face from the knife, said plate being provided with series of slots disposed diagonally with respect to the direction of rotation of the knife and having curled margins engaging the holder for biasing the plate on the knife for effecting a shear cutting action between the flat peripheries of the blades and the walls of the slots of the plate.

3. In a shaving instrument, the combination comprising a rotary knife having series of radial blade wings disposed obliquely to the direction of rotation of the knife and provided with flat peripheries forming cutting edges, and a plate for protecting the face from the knife, said plate being provided with series of slots disposed diagonally with respect to the direction of rotation of the knife, the edges of the slots forming other cutting edges, co-operable with the cutting edges of the blade wings for providing a scissors effect therebetween.

4. In a shaving instrument, the combination comprising a holder, a rotary knife within the holder having series of helical blades provided with flat peripheries forming cutting edges, and a plate for protecting the face from the knife, said plate being provided with series of slots disposed diagonally with respect to the direction of rotation of the knife, the edges of the slots forming other cutting edges, co-operable with the cutting edges of the blades for providing a scissors effect therebetween, the plate having curled margins engaging the holder for biasing the plate upon the flat peripheries of the blades for effecting a honing action on said cutting edges.

5. In a shaving instrument, the combination comprising a tubular housing having a longitudinal slot, a perforated face guard resiliently supported in and between the walls of said slot, and a rotary cutting element, disposed in the housing and having sliding peripheral engagement with the guard.

6. In a shaving instrument, the combination comprising a tubular housing having a longitudinal slot, the inside wall of the housing having a longitudinal groove adjacent to each side wall of the said slot, a perforated face guard having curled side margins for resilient engagement with the walls of said grooves, and a rotary cutting element disposed in the housing, and having peripheral engagement with the guard.

7. In a shaving instrument, the combination comprising a tubular housing having a longitudinal slot, the inside wall of the housing having a longitudinal groove adjacent to each side wall of said slot, a perforated face guard slidable between the walls of said grooves, a rotary cutting element disposed within the housing and having peripheral engagement with said guard, a removable closure for one end of the housing for retaining the guard therein, means on the closure for rotarily supporting one end of the cutting element, and a prime mover mounted on the other end of the housing, the shaft of the prime mover having removable engagement with the other end of the cutting element.

8. In a shaving instrument, the combination comprising a tubular housing having a longitudinal slot, a perforated face guard resiliently supported for slidable movement in said slot, and a rotary knife disposed in the housing for shearing co-operation with the walls of the perforations in the guard.

9. In a shaving instrument, the combination comprising a tubular housing having a longitudinal slot, a perforated face guard resiliently supported in said slot, and a rotary knife, comprising a shaft and series of knife-members mounted in spaced relation on the shaft, each of said members having series of radial wings disposed obliquely to the direction of rotation of the shaft, and being provided with flat peripheries for shearing co-operation with the walls of the perforations in the guard.

10. In a shaving instrument, the combination comprising a rotary knife having a rigid core and a helical blade completely encircling and rigid with said core; a slotted plate for protecting the face from the knife; the plate having its slots disposed at an angle of less than 90° to the cutting edge of the blade and the edges of said slots coacting in scissors action with the helical blade when the blade is revolved; a handle housing a motor drive for said knife, and forming the sole support of said knife and plate.

11. In a shaving instrument the combination comprising a rotary knife having a central rigid core and a radial blade wing disposed obliquely to the direction of rotation of the knife and provided with a flat periphery forming a cutting edge; said blade comprising at least a portion of a helix completely surrounding the core; a plate for protecting the face from the knife; said plate being provided with a series of slots each disposed at an angle of less than 90° to the cutting edge of the knife; the edges of the slots forming other cutting edges, co-operable with the cutting edge of the blade wing for providing a scissors effect therebetween; a handle housing a motor drive for said knife, and forming the sole support of said knife and plate.

12. In a shaving instrument, the combination comprising a rotary knife having a rigid core member; a plurality of spacers and blade members assembled in alternation on said core said blade members presenting peripheral cutting edges each at an angle to the axis of said core; a housing for said knife including a slotted face-contacting plate portion; the edges of the slots in said plate portion at an angle to said cutting edges, and the edges of said slots presenting cutting edges co-operable in scissors action with said knife cutting edges; and means to cause revolution of said knife.

13. In a shaving instrument, in combination: a rotor comprising a central rigid core; a helical cutting edge carried by and completely encircling said core; a casing having a bore enclosing said rotor; transverse cutter bars carried by said casing at one portion of said bore spaced longitudinally thereof; each bar carrying a cutting edge to coact with said helical cutting edge and at an angle of less than 90° thereto; and a handle housing means to cause revolution of the rotor.

14. In a shaving instrument, in combination: a rotor comprising a rigid core, a helical cutting edge carried by the core and forming at least one complete turn thereabout; a casing completely surrounding said rotor; a slotted face-contacting plate forming a portion of said casing; edges of the slots in said plate presenting cutting edges at an angle of less than 90° to said helical cutting edge and co-operable therewith in scissors action upon hairs projecting through said slots; and a handle housing means to cause revolution of said rotor.

15. In a shaving instrument, in combination: a rotary knife comprising a rigid core and a helical cutting edge carried by said core; a face contacting plate formed with elongated slots oblique to the axis of said knife; the edges of the slots in said plate coacting in scissors action with said helical cutting edge and at angles of less than 90° thereto to sever hairs projecting through said slots and a handle housing means to cause revolution of said knife.

16. In a shaving instrument, in combination: a rigid rotary knife formed with a helical blade extending completely thereabout; a slotted plate to contact the skin of the user; the slots in said plate disposed at an angle of less than 90° to the cutting edge of said blade and edges of said slots coacting in scissors action with said cutting edge of the blade when the blade is revolved; and a handle housing a motor drive for said knife.

17. In a shaving instrument, the combination comprising a tubular housing having a longitudinal slot, the inside wall of the housing having a longitudinal groove adjacent each wall of the said slot, a perforated face guard having margins for engagement with the walls of said grooves, and a rotary cutting element disposed in the housing and having peripheral engagement with the guard.

DONALD W. BRANSTETTER.